United States Patent [19]

Cowley

[11] Patent Number: 4,876,641

[45] Date of Patent: Oct. 24, 1989

[54] VLSI DATA PROCESSOR CONTAINING AN ARRAY OF ICS, EACH OF WHICH IS COMPRISED PRIMARILY OF AN ARRAY OF PROCESSING

[75] Inventor: Colin H. Cowley, Stalybridge, Great Britain

[73] Assignee: Active Memory Technology Ltd., Reading, England

[21] Appl. No.: 80,300

[22] Filed: Jul. 31, 1987

[30] Foreign Application Priority Data

Aug. 2, 1986 [GB] United Kingdom ............... 8618943

[51] Int. Cl.⁴ .................................... G06F 15/16
[52] U.S. Cl. .................. 364/200; 364/231.9; 364/228.3; 364/229.4
[58] Field of Search ... 364/200 MS File, 900 MS File; 377/70, 75

[56] References Cited

U.S. PATENT DOCUMENTS

| | | | |
|---|---|---|---|
| 3,308,436 | 3/1967 | Borck, Jr., et al. | 364/200 |
| 3,815,095 | 6/1974 | Wester | 364/200 |
| 3,898,480 | 8/1975 | Spence et al. | 377/78 |
| 3,979,728 | 9/1976 | Reddaway | 364/200 |
| 4,174,514 | 11/1979 | Sternberg | 364/200 |
| 4,344,134 | 8/1982 | Barnes | 364/200 |
| 4,415,973 | 11/1983 | Evans | 364/200 |
| 4,466,064 | 8/1984 | Martin | 364/200 |
| 4,546,428 | 10/1985 | Morton | 364/200 |
| 4,580,215 | 4/1986 | Morton | 364/200 |
| 4,621,339 | 11/1986 | Wagner et al. | 364/900 |
| 4,622,632 | 11/1986 | Tanimoto et al. | 364/200 |
| 4,644,496 | 2/1987 | Andrews | 364/900 |
| 4,709,327 | 11/1987 | Hillis et al. | 364/200 |
| 4,720,780 | 1/1988 | Dolecek | 364/200 |
| 4,745,546 | 5/1988 | Grinberg et al. | 364/200 |
| 4,773,038 | 9/1988 | Hillis et al. | 364/900 |

OTHER PUBLICATIONS

Toshio Kondo et al., "An LSI Adaptive Array Processor", *IEEE Journal of Solid-State Circuits*, vol. SC-18, No. 2, Apr., 1983.

Primary Examiner—Jerry Smith
Assistant Examiner—James J. Kulbaski
Attorney, Agent, or Firm—Lyon & Lyon

[57] ABSTRACT

A data processor comprises an array of integrated circuits (ICs), each of which comprises an array of data processing elements (PEs) connected to allow transfer of data. The PEs of the data processor may be organized into array-wide rows and columns with data transfer along each row or column. Rows and columns may be subdivided into sections, such division being either intra-chip (all PEs on one IC) or inter-chip (PEs from different ICs), and each section may be arranged for cyclical data transfer within the section. Shift registers with parallel outputs for intra-chip data transfer may be combined with a multiplexer for selecting between parallel data paths and a parallel data output of a local memory for each PE. Similarly, shift registers with serial outputs for inter-chip data transfer may be combined with a multiplexer for selecting between serial data paths and serial outputs of the shift registers.

5 Claims, 4 Drawing Sheets

4,876,641

VLSI DATA PROCESSOR CONTAINING AN ARRAY OF ICS, EACH OF WHICH IS COMPRISED PRIMARILY OF AN ARRAY OF PROCESSING

BACKGROUND TO THE INVENTION

This invention relates to data processing apparatus of the kind comprising an array of processing elements operable in parallel on data held in respective local memories, the elements being connected together in rows and columns to allow transfer of data between adjacent elements in each row and column.

Such apparatus is described for example in British Patent Specifications Nos. 1 445 714 and 2 103 400, and is particularly useful for processing data comprising large arrays or vectors, consisting of a large number of individual data items.

In operation of such apparatus, it is necessary to map the data on to the processing elements in some way, i.e. to assign each data item to the particular processing element that is to operate upon it. Also, it may be necessary to change the mapping of the data during the course of a calculation. The mapping of data items and the transformation between different mappings are discussed in a paper by P. M. Flanders, entitled "A unified approach to a class of data movements on an array processor", IEEE Transactions on Computers, Vol. C-31, no. 9, September 1982.

The object of the present invention is to provide a data processing apparatus of the kind specified, in which transformation between different data mappings is facilitated.

SUMMARY OF THE INVENTION

According to the present invention there is provided data processing apparatus comprising:
(a) an array of processing elements,
(b) means for connecting the elements together in rows and columns to allow transfer of data between adjacent elements in each row and column, and
(c) switching means in each row and column for subdividing that row/column into a plurality of sections and for interconnecting first and last elements in each said section to allow data to be shifted cyclically through the elements in that section.

BRIEF DESCRIPTION OF THE DRAWINGS

One data processing apparatus in accordance with the invention will now be described by way of example with reference to the accompanying drawngs.

FIG. 4A shows connections within a chip for performing a first level of data transformation. FIG. 4B shows connections within a chip for performing a second level of data transformation.

DESCRIPTION OF AN EMBODIMENT OF THE INVENTION

Figure 1:
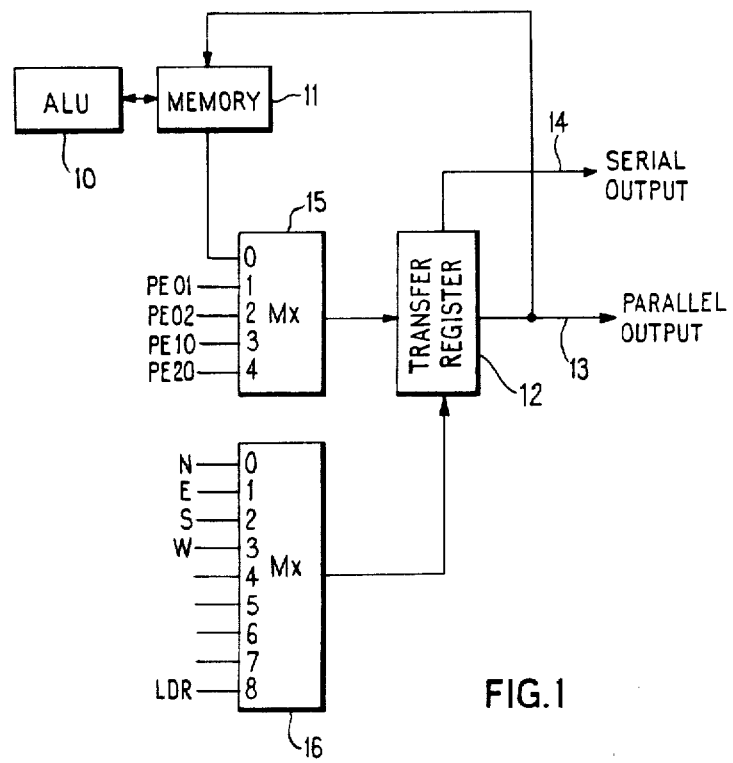
FIG. 1 shows a processing element (PE).

Referring to FIG. 1, the processing element (PE) includes an arithmetic and logic unit (ALU) 10, and a local memory 11 which holds data items for processing in the PE. The local memory 11 is a random-access memory and has a 4-bit wide data input and output.

Transfer of data between this PE and the other PEs takes place by way of a 4-bit shift register 12, referred to as the transfer register. The transfer register has a 4-bit wide parallel output path 13 which is connected to the data input of the local memory 11, and is als connected to be selected by other PEs on the same chip, as will be described. The transfer register 12 as has a serial output path 14 which provides an output signal for routing to the four nearest neighbour PEs in the array, in the north, east, south and west directions, as will be described.

The transfer register can receive input data in parallel, four bits at a time, from a first multiplexer 15. Alternatively, it can receive input data serially, one bit at a time, from a second multiplexer 16.

The first multiplexer 15 has five inputs (0–4). Input 0 is connected to the data output of the local memory 11. Inputs 1–4 are connected to the parallel output paths 13 of other PEs on the same chip, as will be described below with reference to FIGS. 4A and 4B.

The second multiplexer 16 has nine inputs 0–8. Inputs 0–3 are connected to receive signals N, E, S and W from the serial output paths 14 of the four neighbouring PEs in the array, in the north, east, south ad west directions respectively. Inputs 4–7 are not relevant to the present invention. Input 8 receives a signal LDR from a long-distance routing circuit as will be described below with reference to FIG. 5.

Figure 2:
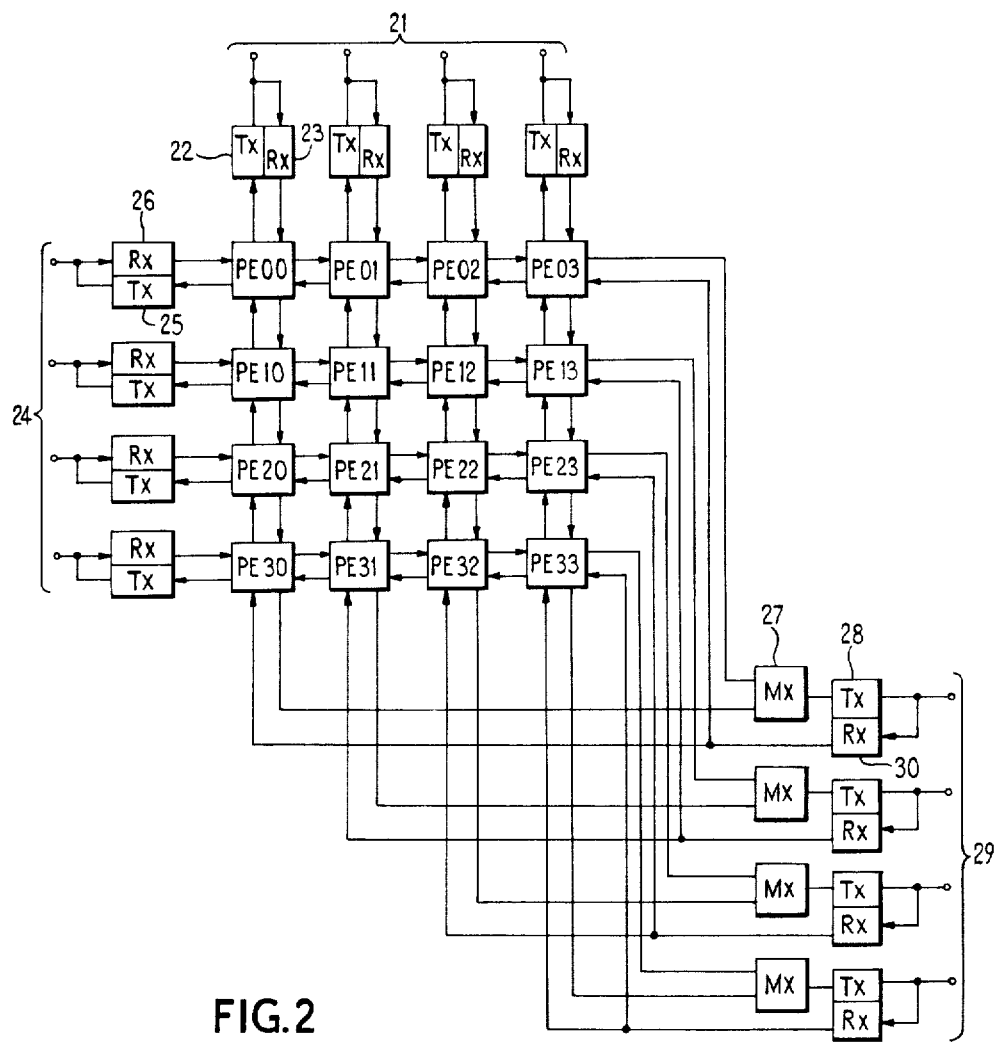
FIG. 2 sows an integrated circuit chip comprising a 4×4 sub-arrays of PEs.

Referring now to FIG. 2, this shows a very-large scale integrated circuit (VLSI) chip containing a 4×4 sub-array of processing elements PE00–PE33.

As described above, the serial output path 14 of each PE is connected to the N, E, S and W inputs of the neighbouring PEs on the same chip.

In the case of the four PEs on the northern edge of the sub-array (PE00, PE01, PE02 and PE03) the serial output paths 14 are also respectively connected to four input/output pins 21, by way of transmitter circuits 22. The input/output pins 21 are also connected by way of receiver circuits 23, to the N inputs of these four PEs.

Similarly, the four PEs on he western edge of the sub-array (PE00, PE10, PE20 and PE30) have their serial output paths 14 connected respectively to four input/output pins 24 by way of transmitter circuits 25. The pins 24 are also connected by way of receiver circuits 26 to the W inputs of these four PEs.

The serial output paths 14 of the four PEs on the eastern edge (PE30, PE13, PE23 and PE33) and of the four PEs on the southern edge (PE30, PE31, PE32 and PE33) are connected in pairs to the inputs of four 2:1 multiplexers 27, the outputs of which are fed, by way of transmitter circuits 28 to four input/output pins 29. The pins 29 are also connected by way of receiver circuits 30 to the E inputs of the PEs on the eastern edge and to the S inputs of the PEs on the southern edge.

It can be seen that the pins 29 are therefore shared between the PEs on the eastern and southern edges of the sub-array. The reason for sharing the pins in this way is to reduce the total number of pins required on the VLSI chip for routing data. This feature is described in the above-mentioned British Patent Specification No. 2 103 400.

Figure 3:
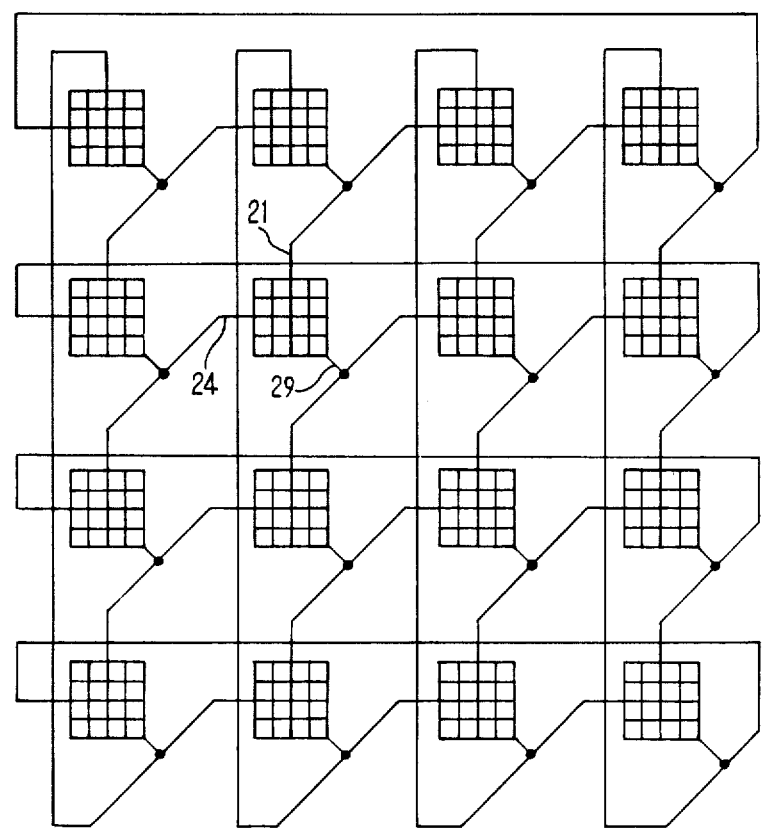
FIG. 3 shows sixteen such chips connected together to form a 16×16 array of PEs.

Referring now to FIG. 3, this shows the way in which sixteen of the VLSI chips are connected together to form an array consisting of sixteen rows and sixteen columns of PEs.

As can be seen from this figure, the pins 21 on the northern edge of each chip are connected to the multiplexed pins 29 of the adjacent chip in the northern direction and the pins 24 on the western edge of each chip are connected to the multiplexed pins 29 of the adjacent chip in the western direction. The multiplexed pins 29 on each chip are connected both to the pins 21 of the adjacent chip in the southern direction and to the pins 24 of the adjacent chip in the eastern direction.

The connections between the PEs and chips described so far allow data to be routed between neighbouring PEs in any of the directions: north, east, south and west.

To route data northwards, the multiplexer 16 in each PE is set to select its S input, i.e. to select data from the serial output 13 of its southern neighbour.

Similarly, to route data eastwards, the multiplexer 16 in each PE is set to select its W input, i.e. to select data from serial output 13 of its western neighbour.

In the case of routing data southwards or westwards, the multiplexers 27 must also be set to select the appropriate edge of the sub-array within each chip.

Thus, to route data southwards, the multiplexer 16 in each PE is set to select its N input and at the same time the multiplexers 27 in each chip are set to select data from the southern edge of the sub-array.

Similarly, to route data westwards, the multiplexer 16 in each PE is set to select its E input and at the same time the multiplexers 27 in each chip are set to select data from the western edge of the sub-array.

In addition to the nearest-neighbour connections described above, the PEs are also connected so as to allow each row or column of the array to be divided into sections, and the two halves of each section to be interchanged, so as to facilitate transformations of the mapping of the data into the PEs.

In the case of a 16×16 array, there are four levels at which the interchange of data can take place.

(1) Each row or column is divided into eight pairs of PEs, and data is interchanged between the two PEs of each pair.
(2) Each row or column is divided into four sections, each containing four PEs, and data is interchanged between the first two and last two PEs in each section.
(3) Each row or column is divided into two sections, each containing eight PEs, and data is interchanged between the first four and last four PEs in each section.
(4) Data is interchanged between the first eight and the last eight PEs in each row or column. The first and second levels of interchange are performed by means of the multiplexers 15 within the PEs (FIG. 1).

As described above, each multilex 15 has its inputs 1-4 connected to the parallel outputs paths 13 of four other PEs on the same chip. Specifically, these connections are as follows:

| PE | Multiplexer 15 inputs | | | |
|---|---|---|---|---|
| | 1 | 2 | 3 | 4 |
| 00 | 01 | 02 | 10 | 20 |
| 01 | 00 | 03 | 11 | 21 |
| 02 | 03 | 00 | 12 | 22 |
| 03 | 02 | 01 | 13 | 23 |
| 10 | 11 | 12 | 00 | 30 |
| 11 | 10 | 13 | 01 | 31 |
| 12 | 13 | 10 | 02 | 32 |
| 13 | 12 | 11 | 03 | 33 |
| 20 | 21 | 22 | 30 | 00 |
| 21 | 20 | 23 | 31 | 01 |
| 22 | 23 | 20 | 32 | 02 |
| 23 | 22 | 21 | 33 | 03 |
| 30 | 31 | 32 | 20 | 10 |
| 31 | 30 | 33 | 21 | 11 |
| 32 | 33 | 30 | 22 | 12 |
| 33 | 32 | 31 | 23 | 13 |

Thus, for example, in the case of PE00 (illustrated in FIG. 1) the inputs 1-4 of the multiplexer 15 are connected to the parallel output paths 13 of PE01, PE02, PE10 and PE20 respectively.

Figure 4A:
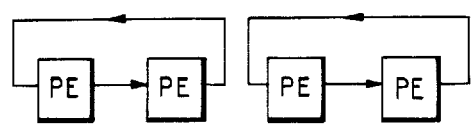
FIGS. 4A and 4B connections within a chip for performing a first two levels of data transformation.

To produce the first level of data interchange described above for a row of PEs each multiplexer 15 is operated to select its input 1. This causes the four PEs in eac row of the chip to be connected together as shown in FIG. 4A, so as to allow data in each adjacent pair of PEs in the same row to be intercanged.

Figure 4B:
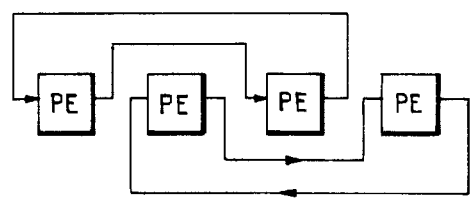

Similarly, to produce the second level of data interchange for a row of PEs, each multiplexer 15 is operated to selected its input 2. This causes the four PEs in each row of the chip to be connected together as shown in FIG. 4B. This allows data in the first and second PEs in each row to be interchanged with data in the third and fourth PEs respectively of the same row.

Alternatively, the first and second levels of interchange can be performed for columns of PEs by selecting inputs 2 and 3.

Figure 5:
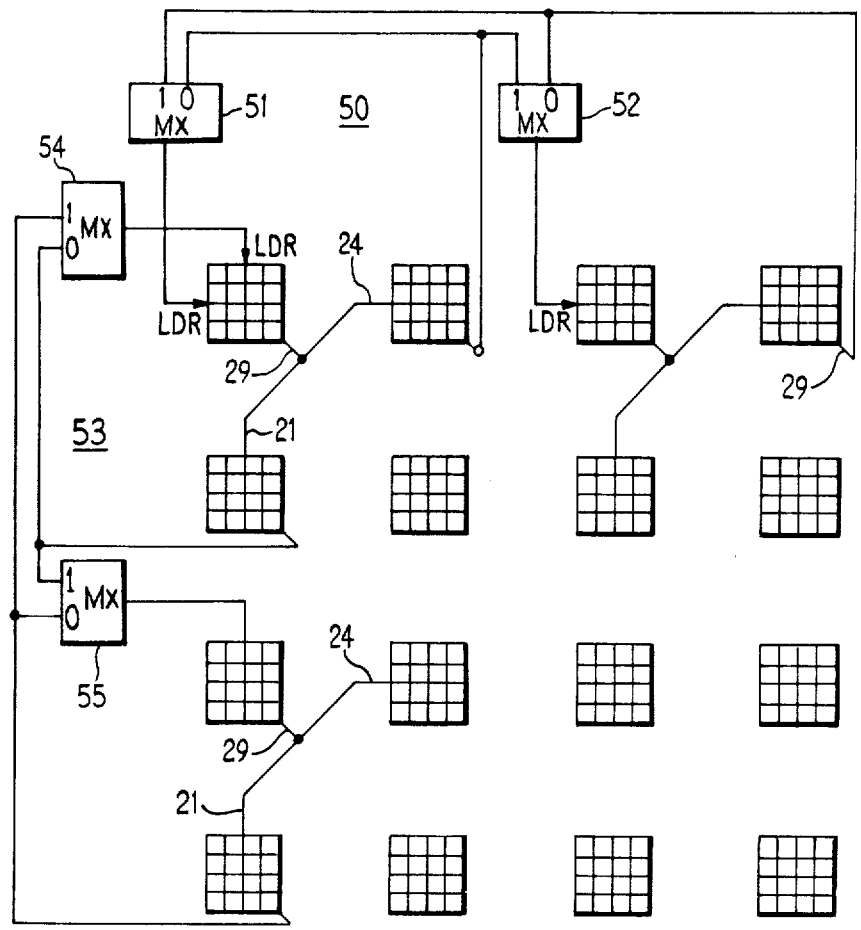
FIG. 5 shows connections between chips for performing a further two levels of data transformation.

Referring now to FIG. 5, each row of chips has a long-distance routing circuit 50 associated with it. Only one of these circuits 50 is shown in the Figure: the other rows have similar circuits. Each long-distance routing circuit consists of two multiplexers 51, 52.

Input 0 of multiplexer 51 is connected to the pins 29 of the second chip in the row, while input 1 is connected to the pins 29 of the fourth chip in the row. The output of the multiplexer 51 is connected to the LDR inputs of the PEs on the western edge of the third chip in the row.

Input 0 of multiplexer 52 is connected to the pins 29 of the fourth chip in the row, while input 1 is connected to the pins 29 of the second chip in the row. The output of the multiplexer 52 is connected to the LDR inputs of the PEs on the western edge of the first chip in the row.

Similarly, each column of chips has a long-distance routing circuit 53 associated with it (only one shown). Each of these circuits 53 consists of two multiplexers 54 and 55, connected in a similar manner to the multiplexers 51, 52 as shown.

To produce the level 3 interchange specified above for the rows of PEs, the multiplexers 51, 52 areoperated to select input 0. At the same time, the multiplexers 16 in each PE on the western edge of each chip are operated to select their LDR inputs, while the multiplexers 16 in all the other PEs are operated to select their W inputs. This causes each row of PEs to be divided into two groups of eight PEs, with the PEs in each group being connected in a loop. This allows data to be shifted circularly around each loop. It can be seen that after sixteen shifts, the data in the two halves of each loop will have been interchanged as required.

Similarly, to produce the level 4 interchange for the rows of PEs, the multiplexers 51, 52 are operated to select input 1. The multiplexers 16 in each PE are operated as for the level 3 interchange. This causes each row of PEs to be connected together in a single loop. After thirty-two shifts around this loop, the data in the two halves of the loop will have been interchanged as required.

It will be appreciated that the system described above can readily be extended to provide larger arrays of PEs, e.g. a 32×32 array or a 64×64 array.

I claim:
1. Data processing apparatus comprising:
   (a) a plurality of integrated circuit chips each comprising a plurality of data processing elements,
   (b) means for connecting said processing elements on all the chips together to form an array of rows and columns, allowing transfer of data between adjacent elements in each row and column,
   (c) first switching logic means within each chip for subdividing each row/column into a first plurality of sections, all said processing elements in each individual section being on the same chip, and for interconnecting first and last processing elements in each said section to allow data to be shifted cyclically through said processing elements in that section, and
   (d) second switching logic means external to the chips for subdividing each row/column into a second plurality of sections, each of which contains processing elements from at least two different ones of said chips, and for interconnecting first and last processing elements in each section to allow data to be shifted cyclically through said processing elements in that section.

2. Apparatus according to claim 1 wherein the first switching logic means comprises means for shifting data between sad processing elements by way of parallel data paths, and the second switching logic means comprises means for shifting data between said processing elements by way of serial data paths.

3. Apparatus according to claim 2 wherein each processing element comprises a shift register having a parallel output connected to respective one of said parallel data paths and a serial output connected to a respective one of said serial data paths.

4. Apparatus according to claim 3 wherein each processing element includes a local memory having a parallel data output, and a multiplexer having:
   (a) an output connected to a parallel input of said shift register,
   (b) a first input connected to the parallel data output of the local memory, and
   (c) a plurality of further inputs connected to the parallel data outputs of the shift registers in the other processing elements in the same chip.

5. Apparatus according to claim 3 wherein each processing element comprises a multiplexer having:
   (a) an output connected to a serial input of said shift register,
   (b) a first input connected to a respective one of said serial data paths, and
   (c) a plurality of further inputs connected to the serial data outputs of the shift registers in neighbouring processing elements in the array.

* * * * *